(12) United States Patent
Drechsler et al.

(10) Patent No.: US 9,869,695 B1
(45) Date of Patent: Jan. 16, 2018

(54) ATOMIC-FORCE MICROSCOPE SYSTEM WITH INTEGRATED FABRY-PEROT RESONATOR

(71) Applicant: International Business Machines Corporation, Armonk, NY (US)

(72) Inventors: Ute Drechsler, Rueschlikon (CH); Urs T Duerig, Rueschlikon (CH); Armin Knoll, Adliswill (CH); Thilo Stoeferle, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/248,746

(22) Filed: Aug. 26, 2016

(51) Int. Cl.
*G01Q 60/24* (2010.01)
*G01Q 20/02* (2010.01)
*G01B 9/02* (2006.01)

(52) U.S. Cl.
CPC ............ *G01Q 20/02* (2013.01); *G01B 9/02* (2013.01); *G01B 2290/25* (2013.01)

(58) Field of Classification Search
CPC ........ G01Q 10/00; G01Q 10/02; G01Q 10/04; G01Q 20/00; G01Q 20/04; G01Q 60/24; G01Q 60/38
USPC ................ 850/1, 2, 3, 5, 6, 33, 40
See application file for complete search history.

(56) References Cited

U.S. PATENT DOCUMENTS 5,394,741 A * 3/1995 Kajimura ............... B82Y 35/00
356/614

| 6,713,743 | B2 | 3/2004 | Kim et al. |
| 7,319,527 | B2 | 1/2008 | Frederix et al. |
| 7,797,757 | B2 | 9/2010 | Degertekin |
| 8,261,602 | B2 | 9/2012 | Degertekin |
| 2002/0039463 | A1* | 4/2002 | Degertekin ............ G01D 5/38 385/12 |
| 2011/0035849 | A1* | 2/2011 | Finlan .................... G01Q 60/34 850/6 |

(Continued)

OTHER PUBLICATIONS

Levent Degertekin, F; Georgia Inst. of Technol., Atlanta "Novel Atomic Force Microscope Probes with Integrated Electrostatic Actuation and Optical Detection" pp. 832-833, ISSN: 1092-8081.

(Continued)

*Primary Examiner* — Nicole Ippolito
(74) *Attorney, Agent, or Firm* — Harrington & Smith (57) ABSTRACT

An atomic-force microscope system is provided including: an electrically conducting cantilever support; an electrically insulating element; and an electrically conducting cantilever anchored at a first end to the cantilever support via the insulating element, the cantilever including a probe tip at a second end opposite to the first end and the cantilever support is configured as a backside electrode of the cantilever for backside actuation thereof; a Fabry-Perot interferometer including: a resonator with a first mirror defined on the cantilever; and a second mirror defined on the cantilever support having a first side and a second side configured to allow light injection, opposite to the first side, the latter extending at least partly vis-à-vis the first mirror. The interferometer includes a light-emitting device, and a detector configured for detecting a property of the system impacted by interferences of light emitted by the light-emitting device. Methods of operations are also provided.

20 Claims, 8 Drawing Sheets

(56) References Cited

U.S. PATENT DOCUMENTS

2014/0047585 A1* 2/2014 Hofrichter ............. G01Q 20/02
850/56
2014/0130214 A1 5/2014 Solgaard et al.

OTHER PUBLICATIONS

"Interferometer-Based AFM for Measuring with Small Cantilevers" published on Imaging & Microscopy (http://www.imaging-git.com) Jun. 1, 2005.
A. Ruf, M. Abraham, J. Diebel, W. Ehrfeld, P. Guthner, M. Lacher, K. Mayr, and J. Reinhardt "Integrated Fabry-Perot Distance Control for Atomic Force Microscopy" Journal of Vacuum Science & Technology B. http://dx.doi.org/10.1116/1.589295.
N.C. Shie, T.L. Chen, Kai Yuan Cheng "Use of Fiber Interferometer for AFM Cantilever Probe Displacement Control" researchgate.net/publication/240830207_Use_of_ _Fiber_Interferometer_for_ AFM_Cantilever_Probe_Displacement_Control.

* cited by examiner

ATOMIC-FORCE MICROSCOPE SYSTEM WITH INTEGRATED FABRY-PEROT RESONATOR

BACKGROUND

The invention relates to the field of atomic force microscopy and atomic force microscopes. In particular, it is directed to atomic force microscopes comprising an integrated, Fabry-Perot-like interferometer readout.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Scanning probe microscopy (or SPM) techniques rely on scanning a probe, e.g., a sharp tip, in close proximity with a sample surface whilst controlling interactions between the probe and the surface. An image of the sample surface can thus be obtained, typically in a raster scan of the sample. In a raster scan the probe-surface interaction is recorded as a function of position and images can be produced as a two-dimensional grid of data points.

The lateral resolution achieved with SPM varies with the underlying technique: atomic resolution can be achieved in some cases. Use can be made of piezoelectric actuators to execute scanning motions with precision and accuracy. The two main types of SPM are the scanning tunneling microscopy (STM) and the atomic force microscopy (AFM). In the following, acronyms STM/AFM may refer to either the microscopy technique or to the microscope itself.

In particular, an AFM apparatus or system allows the topography of a sample to be modified or sensed by a probe tip arranged at one end of a cantilever. As the sample is scanned, interactions between the probe and the sample surface cause pivotal deflection of the cantilever. The topography of the sample may thus be determined by detecting the deflection of the probe. In addition, the surface topography may be modified by controlling the deflection of the cantilever or the physical properties of the probe.

The probe usually consists of a sharp tip, which has a nominal tip radius on the order of 10 nm. Changes in the tip-sample interaction are often monitored using an optical lever detection system, in which a laser beam is reflected off of the cantilever and onto a position-sensitive photodetector. When scanning, a particular operating parameter is maintained at a constant level, and images are generated through a feedback loop between the optical detection system and the piezoelectric scanners. For a scanning stylus atomic force microscope, the probe tip is scanned above a stationary sample, while in a scanning sample design, the sample is scanned below a fixed probe tip.

Applications of AFM and other types of SPM keep on growing; they notably include biological materials (e.g., for studying DNA structure), polymeric materials (e.g., for studying morphology, mechanical response, and thermal transitions), and semiconductors (e.g., for detecting defects). In particular, AFM systems can be utilized to evaluate the surface quality of products such as contact lenses, optical components and semiconductor wafers after various cleaning, etching, or other manufacturing processes.

Three main imaging modes are known which can be used to obtain topographic images. These are the so-called: (i) contact mode; (ii) non-contact mode; and (iii) intermittent contact or tapping mode.

In contact mode, the probe is dragged across the surface. A constant flexure, or bend, in the cantilever is maintained. As the topography of the surface changes, the relative position of the tip with respect to the sample must be moved to maintain this constant deflection. The topography of the surface can thus be mapped using a feedback mechanism; the motion of the z-scanner corresponds to the sample topography. To minimize the amount of applied force used to scan the surface, low spring constant (e.g., k<1 N/m) probes are used. However, significant deformation and damage of soft samples (e.g., biological and polymeric materials) may occur during contact mode imaging. The combination of the applied normal force, the lateral forces (resulting from dragging the probe tip across the sample), and the small contact areas involved result in contact stresses that can damage the sample, the tip, or both.

To overcome this limitation, contact mode imaging can be performed within a liquid environment, which lowers problems due to, e.g., surface contamination such that lower contact forces can be used. Yet, imaging samples in a liquid environment are not always possible or practical.

To reduce the damages inherent to contact mode, the cantilever can be oscillated near its first (or fundamental) bending mode resonance frequency (e.g., on the order of 100 kHz) as the probe is raster scanned above the surface. This can be done in non-contact mode or tapping mode.

In non-contact mode, both the tip-sample separation and the oscillation amplitude are on the order of 1 to 10 nm, such that the tip oscillates just above the surface, essentially imaging the surface of, e.g., the contaminants. The resonance frequency and amplitude of the oscillating probe decrease as the sample surface is approached due to long-range forces extending above the surface (e.g., van der Waals). Either a constant amplitude or constant resonance frequency can be maintained through a feedback loop with the scanner and, just as in contact mode, the motion of the scanner is used to generate the surface image. To reduce the tendency for the tip to be pulled down to the surface by attractive forces, the cantilever spring constant is normally much higher compared to contact mode cantilevers. The combination of weak forces affecting feedback and large spring constants causes the non-contact AFM signal to be small, which leads to unstable feedback and requires slower scan speeds than either contact mode or tapping mode. Also, the lateral resolution in non-contact mode is limited by the nature of the long-range attractive forces and is normally lower than that in either contact mode or tapping mode.

Tapping mode tends to be more applicable to general imaging in air, particularly for soft samples, as the resolution is similar to contact mode, whereas the forces applied to the sample are lower and less damaging. In fact, a main disadvantage of the tapping mode relative to contact mode is the slower scan speed.

In tapping mode, the cantilever oscillates close to its first (fundamental) bending mode resonance frequency, as in non-contact mode. However, the oscillation amplitude of the probe tip is much larger than for non-contact mode, often in the range of 20 nm to 200 nm, and the tip makes contact with the sample for a short duration in each oscillation cycle. As the tip approaches the sample, the tip-sample interactions alter the amplitude, resonance frequency, and phase angle of the oscillating cantilever. During scanning, the amplitude at the operating frequency is maintained at a constant level, called the set-point amplitude, by adjusting the relative position of the tip with respect to the sample. In general, the amplitude of oscillation during scanning is large enough such that the probe maintains enough energy for the tip to tap through and back out of the surface.

As said, one of the main disadvantages of scanned probes in general, and AFM in particular, is the relatively low scanning speed. In fact, there is a trade-off between scanning speed and wear reduction. In general, methods that reduce sample damage tend to slow down the scanning process. These methods mostly rely on avoiding sliding friction, using dynamic techniques, such as the tapping or non-contact modes described above.

On the whole, however, AFM technology is limited by the slow response time of the feedback scheme used to guide the tip across the surface topography. The response time is impacted by the limited mechanical response times of the stage moving the tip (or the sample), the averaging techniques used in the dynamic mode to interpret the received signals and the limited sensitivity at high bandwidth of the detection schemes.

SUMMARY

According to an embodiment, an atomic-force microscope system is provided comprising: an electrically conducting cantilever support; an electrically insulating element; an electrically conducting cantilever anchored at a first end to the cantilever support via the insulating element, wherein: the cantilever comprises a probe tip at a second end thereof; and the cantilever support is configured as a backside electrode of the cantilever for backside actuation thereof, and wherein the system further comprises: a Fabry-Perot interferometer, comprising: a resonator with: a first mirror, defined on the cantilever; and a second mirror, defined on the cantilever support, having a first side and a second side configured to allow light injection, opposite to said first side, the latter extending at least partly vis-à-vis the first mirror; a light-emitting device, configured to emit light toward said second side; and a detector, configured for detecting a property of the system impacted by interferences of light emitted by the light-emitting device that is confined between the first mirror and the second mirror, the interferences depending on a deflection of the cantilever, in operation.

According to another embodiment, a method for measuring a deflection of a cantilever of the atomic-force microscope system described above, the method comprising, while scanning a sample surface: energizing the light-emitting device for it to emit light toward said second side, so as to confine emitted light between the first mirror and the second mirror; and detecting, with said detector, a property of the system that is impacted by interferences of the confined light, the interferences dependent on a deflection of the cantilever.

Devices, systems and methods embodying the present invention will now be described, by way of non-limiting examples, and in reference to the accompanying drawings.

The accompanying drawings show simplified representations of devices or parts thereof, as involved in embodiments. Technical features depicted in the drawings are not to scale. On the contrary, some dimensions and aspect ratios can be exaggerated for depiction purposes. Similar or functionally similar elements in the figures have been allocated the same numeral references, unless otherwise indicated.

DETAILED DESCRIPTION OF EMBODIMENTS OF THE INVENTION

In the following, AFM systems are described, which comprise a cantilever and a backside electrode for fast actuation and motion, combined with an integrated optical resonator. Such systems potentially allow for up to 1000 times higher sensitivity, at similar bandwidth, compared with conventional designs of AFM systems.

In reference to FIGS. 1-8, an exemplary embodiment is first described, which concerns an AFM system 1, 1a. Basically, this system comprises: an electrically conducting cantilever support 20, 20a; an electrically insulating element 5; and an electrically conducting cantilever 10, 10a.

Figure 4:
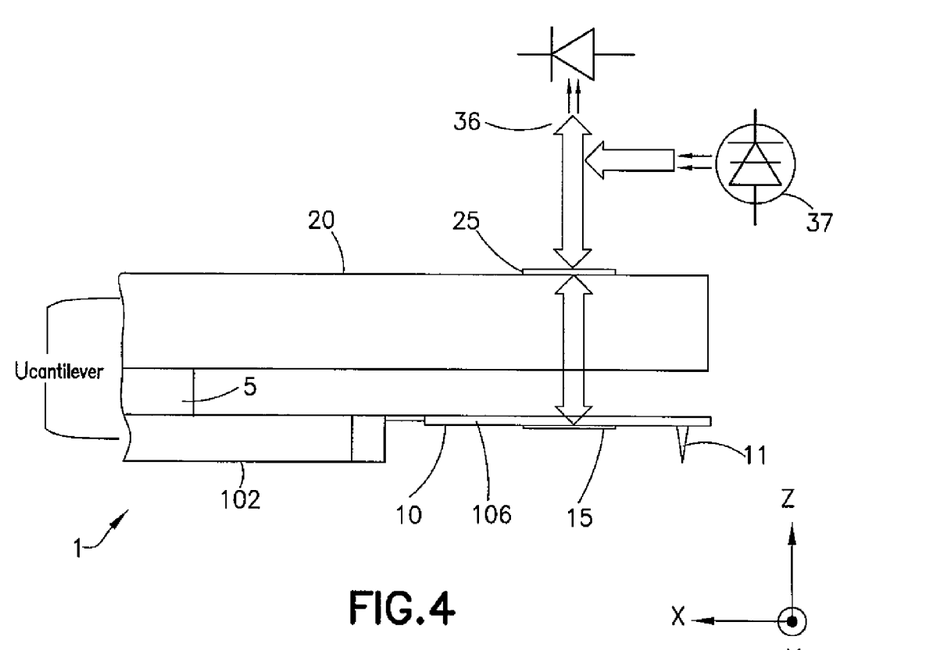
FIGS. 4 and 5 are side views of a cantilever and a backside electrode of AFM systems according to distinct embodiments of the present invention.
Figure 5:
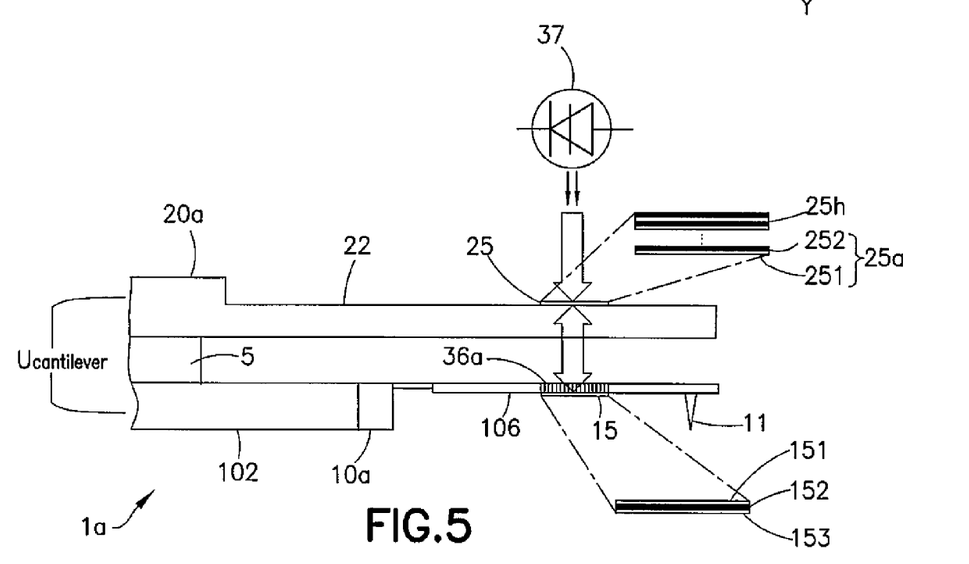

As depicted in FIGS. 4, 5, the cantilever is anchored at a first end to the cantilever support 20, 20a, via the insulating element 5. The cantilever 10, 10a comprises a probe tip 11 at a second end thereof, for example at a free end opposite to the anchorage end. The cantilever 10, 10a is typically a spring-like cantilever.

Generally speaking, the cantilever support 20, 20a is configured as a backside electrode of the cantilever 10, 10a for backside actuation thereof. Backside actuation of a cantilever is known per se. In operation, the cantilever is brought close to a sample surface 38 to scan it, with the probe tip 11 pointing at the surface 38. The support 20, 20a is above the cantilever beam 10, which is itself above the surface 38. Applying a voltage $U_{Cantilever}$ results in bending the cantilever 10, 10a (i.e., in a pivotal deflection of the cantilever), due to electrostatic attractions between the backside electrode 20, 20a and the cantilever 10. In the literature, the cantilever support 20, 20a is often referred to as a backside electrode or a base electrode. In the present case, the support 20, 20a may be a structured, residual portion of a Si handle wafer, if the structure 10, 10a, 5, 20, 20a is fabricated using a silicon-on-insulator fabrication process, as explained below in detail.

The system 1, 1a further comprises a Fabry-Perot interferometer, which comprises an optical resonator, or cavity. The latter is integrated in the sensing electrodes 10, 10a, 20, 20a. Namely, the resonator comprises a first mirror 15, defined on the cantilever 10, 10a, and a second mirror 25, which is defined on the cantilever support 20, 20a. The mirrors 15, 25 are essentially parallel and face-to-face when the cantilever is in a given, nominal deflection state.

As one understands from FIGS. 4, 5, the second mirror 20, 20a need be configured to allow light injection from one side, i.e., the outer side (the upper side in FIGS. 4, 5), such that light can be injected from the top. The other side (i.e., the inner or lower side) is essentially facing the first mirror 15. That is, the outer side of the second mirror is opposite to its inner side, which extends at least partly vis-à-vis the first mirror 15.

The two mirrors 15, 25 are ideally highly reflective, i.e., their reflectivity may for instance be larger or equal to 99.9%. Transmission can be very high (e.g., >99%), thanks to the resonance interference effect of the cavity, as a consequence of the cavity resonance.

The second mirror 25 preferably comprises several layers, superimposed so as to form parallel interfaces, each being partially reflective and partially transmissive, optically, to improve reflectivity. This is explained later in detail.

The interferometer further includes a light-emitting device 37. The latter is generally configured to emit light Le toward the outer (top) side of the top mirror 25, e.g., from the top. Part of the light injected by the light-emitting device 37 into the resonator becomes confined $Lc_1$, $Lc_2$ between the first mirror 15 and the second mirror 25.

The light-emitting device 37 is preferably a laser, e.g., a semiconductor laser that is easily integrable in the system 1, 1a, such as a vertical cavity surface-emitting laser (VCSEL). In variants, however, glass or polymer fibers that guide the light from a light-emitting device (outside the structure) may be used too. The light-emitting device 37 is typically mounted fixed with respect to the mirror 25, so as to allow suitable light injection, irrespective of the actual position (notably in z) of the sensing structure 10, 10a, 5, 20, 20a or the pivotal deflection of the cantilever 10, 10a.

The Fabry-Perot resonator 15, 25 need be suitably dimensioned. It may for instance be dimensioned so that the optical path length is a multiple of $\lambda/2$, where $\lambda$ is the average wavelength of light emitted by the light-emitting device. I.e., the resonator can be designed such that the optical path length between the two mirrors 15, 25 (when the latter are parallel, i.e., for a given, nominal deflection of the cantilever) is a multiple of $\lambda/2$. Standing waves may accordingly form in the resonator, the interference pattern of which may potentially impact properties of the system. Such properties are, for example, the light intensity at the level of, e.g., the cantilever beam 10, 10a or the backside electrode 20, 20a, or the temperature of a component in the vicinity of the cantilever beam 10, 10a or the backside electrode 20, 20a. This is explained later in detail, in reference to FIGS. 7A and 7B.

Note, however, that it can be advantageous to deviate slightly from the ideal value (i.e., a multiple of $\lambda/2$), for detection purposes, and notably in embodiments involving a "side-of-the-fringe" locking of a laser, where the optical path length is not set to the peak center but to the peak side-slope, as discussed later in reference to FIGS. 9 and 10.

In that respect, the interferometer further comprises a detector 36, 36a, which is configured for sensing such a property, as impacted by interferences of the confined light $Lc_1$, $Lc_2$. As said earlier, the interferences, and so the light intensity, depend on the deflection of the cantilever 10, 10a, in operation.

The above solution provides an integrated electrostatic actuation of the cantilever, combined with an integrated optical resonator, the latter forming part of a Fabry-Perot type of interferometric readout. This solution allows a robust system to be obtained, which enables fast actuation, e.g., close to the resonance frequency and fast sensing.

Namely, the timescale to charge the capacitance for actuation is typically much shorter (~ns) than the mechanical timescales of the lever His). Only attractive forces can be applied. Such forces actuate the lever even faster than the mechanical cantilever response timescale given by the fundamental mode. In between the two timescales the lever would act simply as a mass which is accelerated by the force. Thus, with high forces for short times very high actuation speeds can be achieved. This solution is robust because of the integration of the cavity and the mechanical loop is small. The resonances of the lever-backside system are therefore dominated by the lever modes up to frequencies of the backside resonances (which are in the GHz range or larger). Fast sensing is achieved to the large number of photons in the cavity and the typically high speed of the detector, e.g., an integrated photodiode. Remarkably indeed, the detector too can possibly be integrated in the cantilever or the cantilever support, as described below in reference to preferred embodiments. In such a case, the optical readout speed is mainly limited by noise from the photodetector readout process and the shot noise produced from the finite number of photons N. By setting the (e.g., laser) light source power suitably high (e.g., micro- to-milli-Watt) the signal-to-noise ratio becomes high enough to allow high-sensitivity sensing in a high bandwidth. High sensitivity is enabled by the tunable quality factor of the interferometer. For small deflections (ultra-high vacuum applications, e.g., less than 1 nm) the quality factor can be very high, yielding higher sensitivity in comparison to traditional methods.

In addition, the dynamic range of the readout can be adapted to the demands of the system 1, 1a. In principle, the optical source power could be arbitrarily high. In practice, however, a trade-off can be found, to balance the cost for the laser and adverse heating effects on the cantilever. The present approach allows the AFM system to be operated in contact mode or in non-contact mode (pulsed force mode can be contemplated too).

Figure 1:
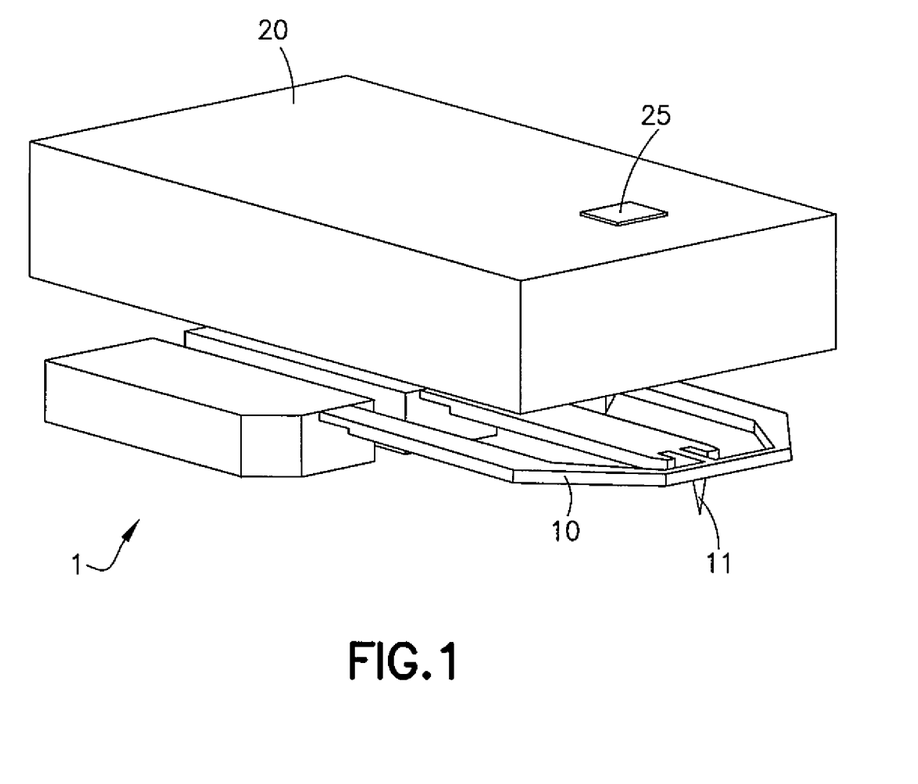
FIGS. 1-3 and 6A are 3D views of components (cantilever and backside electrode) of an AFM system comprising an integrated optical resonator, according to embodiments.
Figure 2:
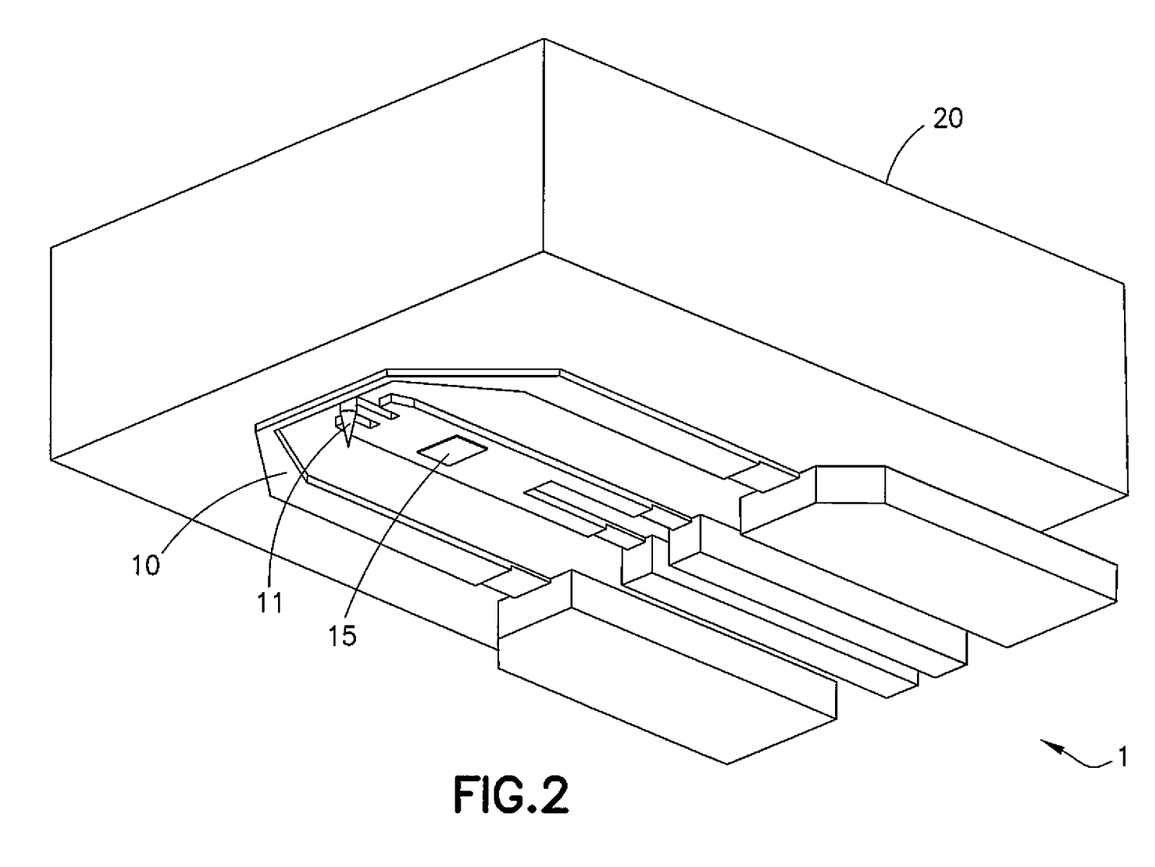
Figure 3:
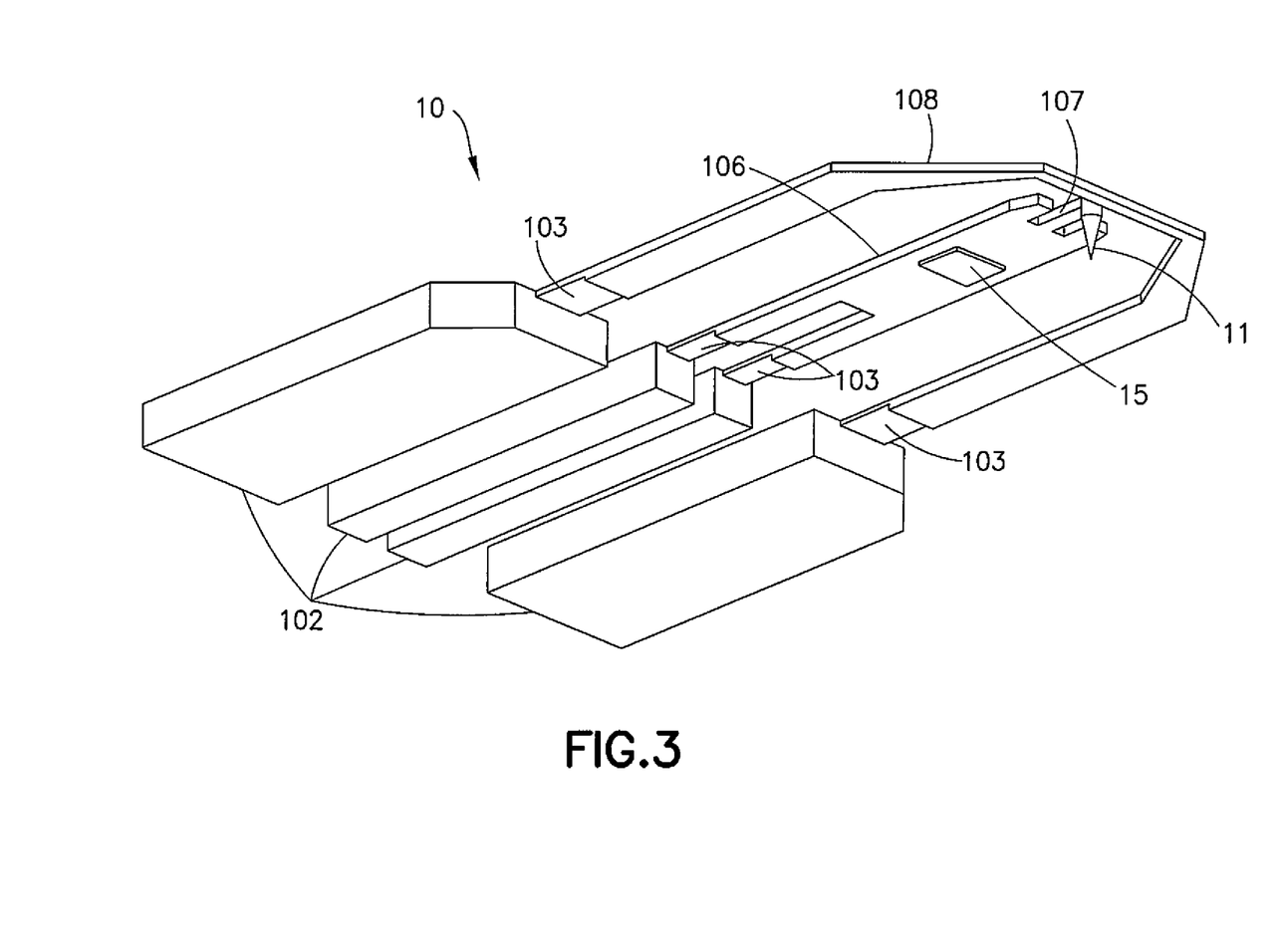

In exemplary embodiments such as depicted in FIGS. 1-3, the cantilever sensor is for instance made of silicon (Si). It may comprise a capacitive element 106, i.e., a platform, for applying and modulating a potential between this element 106 and the backside electrode 20, via suitable excitation means. How to modulate an applied potential is known per se. The modulation may for instance occur at a frequency associated to a higher-order resonant mode of the cantilever sensor. Optionally, the cantilever sensor may comprise a resistive read sensor made of low-doped Si, e.g., for thermo-electrically measuring the relative position of the tip with respect to the sample.

As seen in FIG. 3, a cantilever sensor 10, 10a may preferably comprise contacts 102 and an end section 106-108, wherein the end section is designed for sensing a material surface. Two inner contacts 102 may be provided to sense a photodiode signal, as described later. In embodiments, the Si tip 11 ($\approx$ of 700 nm height) has an apex radius of $\approx$5 nm and is placed on the connecting structure 107 between the capacitive platform 106 and the U-shaped support 108 of the read sensor. Ideally, the tip 11 is placed at the very end of the lever. I.e., the tip 11 is arranged at the free end of the cantilever 10, 10a, in the vicinity of the apex of the end section, opposite to the anchorage end. Furthermore, the end section is preferably flexible with respect to the contacts 102. E.g., a flexible hinge section 103 may optionally be provided, which may lead to distinct spring behaviors. The contacts 102 can be connected directly to the insulating element 5, or via another section (not shown).

A suitable soft response is for instance obtained with a spring constant $C \approx 0.1$ N/m, using a flexible hinge section 103 that has a thickness of $\approx$170 nm. In variants, no hinge section is used, which leads to a spring constant of about 0.3 N/m, for 400-450 nm thick levers. The quality factor of the sensor can be adapted to the dynamic range of the application, as well as the spring constant (i.e., dynamic modes require higher spring constants). For an ultra-high vacuum application, one may contemplate spring constants of up to 1000 N/m. The end section 106-108 of the cantilever may for instance be ≈450 nm thick. The contacts 102 can for example have the same thickness as the end section 106-108. The length of the end section is 65 μm and the resonance frequency of the fundamental bending mode is accordingly ≈50 kHz, or 150 kHz, without hinges.

If necessary, the cantilever may be designed so as to exhibit distinct spring behaviors, using, e.g., two hinge sections (not shown) of distinct thicknesses, instead of only one section 103 as assumed in the appended drawings. A first spring behavior of the cantilever sensor may hence be used to keep the tip in contact with the sample during scanning. Concurrently, a second spring behavior of the cantilever sensor could be excited, in order to modulate an interaction of the sensor and the material surface and thereby reduce the wearing of the material surface. The distinct spring behaviors can be respectively provided by (i) the fundamental, resonant flexure (or bending) mode of the cantilever sensor; and (ii) one or more higher resonant modes. E.g., suitable force constants associated to the first spring behavior may be less than 1 N/m, while the effective force constants associated to the second spring behavior are preferably more than 10 N/m.

In variants, the cantilever may have a bridge structure, as known per se. That is, the cantilever is clamped on two opposite ends (i.e., the cantilever is anchored at two opposite ends to the cantilever support via respective insulating elements) and the tip is arranged near or at the center of the cantilever; it protrudes from a lower, end surface of the cantilever. This makes it possible for a mirror arranged at or near the center surface to always remain substantially parallel to the backside mirror, even when the center surface of the cantilever deflects, in operation.

Referring now to FIGS. 4-7, embodiments are now described, wherein the detector comprises one or more photodetectors 36, 36a. The latter are configured in the system 1, la so as to sense changes in optical properties, e.g., the light intensity, as induced by changes in the interference pattern of the confined light, upon deflection of the cantilever. In embodiments, the photodetector 36 is external, i.e., not integrated in the cantilever or the cantilever support, as in FIG. 4. Optical fibers can for instance be used to that aim. Yet, a photodetector 36a may, in preferred embodiments, be integrated in the cantilever or the cantilever support. It is preferable to integrate it in the cantilever, as in FIG. 5, for reasons that will become apparent later. In that case, one preferably uses a photodiode, for example a p-n photodiode or a PIN photodiode (i.e., having an undoped, intrinsic semiconductor region between the p-type semiconductor and the n-type semiconductor). Depending on the configuration chosen, additional mirrors may be involved, as implicit in FIG. 4. In variants (non-preferred), other properties of the system might be sensed, such as a temperature of a component of the cantilever, which may be impacted by optical interferences in the resonator. In other variants, combined measurements (e.g., optical and temperature) may be used. However, one preferably uses a sensing method that has minimal impact on the confined light and on the cantilever, to allow sustainable measurements without undesired feedback on the cantilever motion.

Integrated detection (FIG. 5) is preferred because it allows an in-situ detection, which, in principle, is more accurate, allows faster response and reduces the complexity of the overall structure by reducing the number of additional separate elements. In such a case, the detector (typically a photodiode 36a) involves a component arranged so as to intercept the optical path of light confined in the resonator. As evoked earlier, this component may be part of the cantilever 10a or the cantilever support 20a. Best, however, is to make it integral with the cantilever 10a, as assumed in FIGS. 5-7. Indeed, the cantilever 10a typically requires more processing than the backside electrode 20, 20a. Thus, integrating a photodiode in such a cantilever 10a only requires modest additional fabrication steps, which can easily be inserted in the usual fabrication step flow. All the more, the cantilever 10a is typically thinner than the electrode 20a, such that the resulting photodiode less critically impacts the confined light, which, in turn, favors sustainable measurements.

The photodiode 36a measures the light intensity at the level of the component 106 of the cantilever 10a. Preferably, a mere p-n junction is used for detection. To that aim, a component (e.g., a platform 106) of the cantilever, meant to be located on the optical path in the resonator, can be p-doped on one side and n-doped on the other, e.g., in an interdigitated fashion (as assumed in FIG. 6A). As usual, the photodiode may be designed to operate in reverse bias. I.e., application of a reverse bias $U_{bias}$ across the p-n junction will typically be needed to produce a photocurrent with fast response time, see FIG. 6B. A reverse bias is not strictly required (e.g., a pn-junction solar cell produces a current without reverse bias applied) but it increases the speed and linearity of the detector.

Figure 6A:
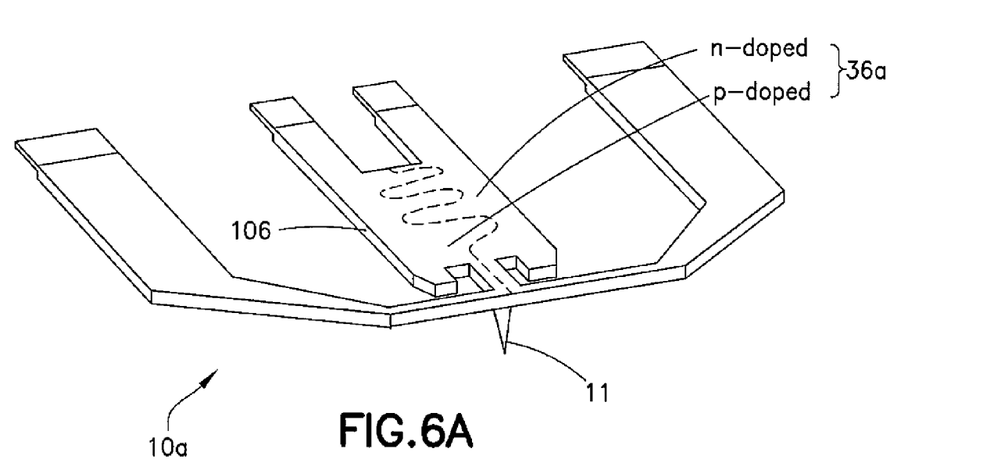

Note that, in the embodiment of FIG. 6A, the outer legs 108 can be used to read the photodiode 36a. Thus, the circuit of FIG. 6B can be connected to the outer legs 108, instead of the n- and p-doped regions of the platform 106. Yet, the outer arms 108 are not strictly needed. They could, however, be used to integrate an additional function at the tip (e.g., a heater). If a heater is integrated into the cantilever, an intrinsic region may be provided in the region 107, just behind the tip, to ensure electrical isolation of the outer heat-path through the tip and the inner sensing path of the photodiode.

Figure 7A:
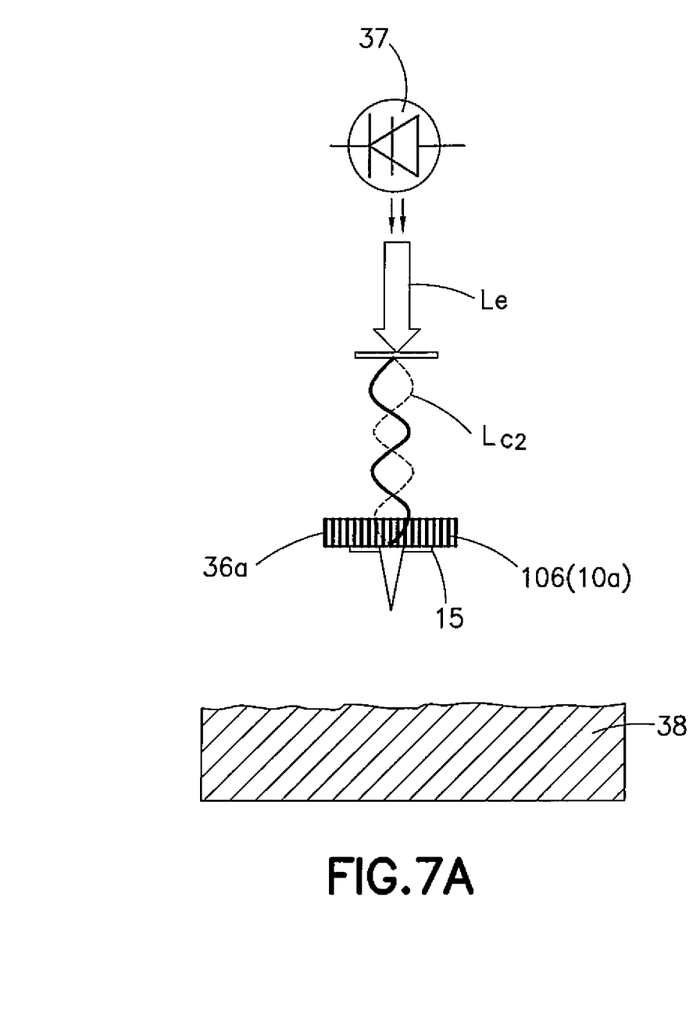
FIGS. 7A and 7B depict front views of components of an AFM system according to FIG. 5, in operation.

The reflectivity of the mirrors can be improved by using distributed Bragg reflectors (DBRs), if necessary. As said earlier, the mirrors 15, 25 are parallel for a given deflection state of the cantilever 10a. In this state, the separation distance between the mirrors 15, 25 can be such that the interference pattern leads, e.g., to zero light intensity at the level of the mirrors, as assumed in FIG. 7A. As seen in FIG. 7A, substantial light intensity may nevertheless be measurable, e.g., at the level of the cantilever beam platform 106. Thus, passing from a given, nominal position (FIG. 7A) to a deflected position (FIG. 7B) by applying a voltage $U_{Cantilever}$ leads, in principle, to measurable intensity changes. Abrupt changes may theoretically be obtained; a kind of on/off resonance measurement may results from the changing the deflection of the tip 11. In practice, however, the mirrors are not strictly parallel and other factors contribute to introduce dispersion in the interference pattern. As a result, the detector's measurements give rise to continuously changing values, which can be calibrated. This way, the deflection of the cantilever can be accurately monitored in-situ, which allows, in turn, a fast reaction to be implemented, using, e.g., a conventional dynamic feedback.

Figure 8:
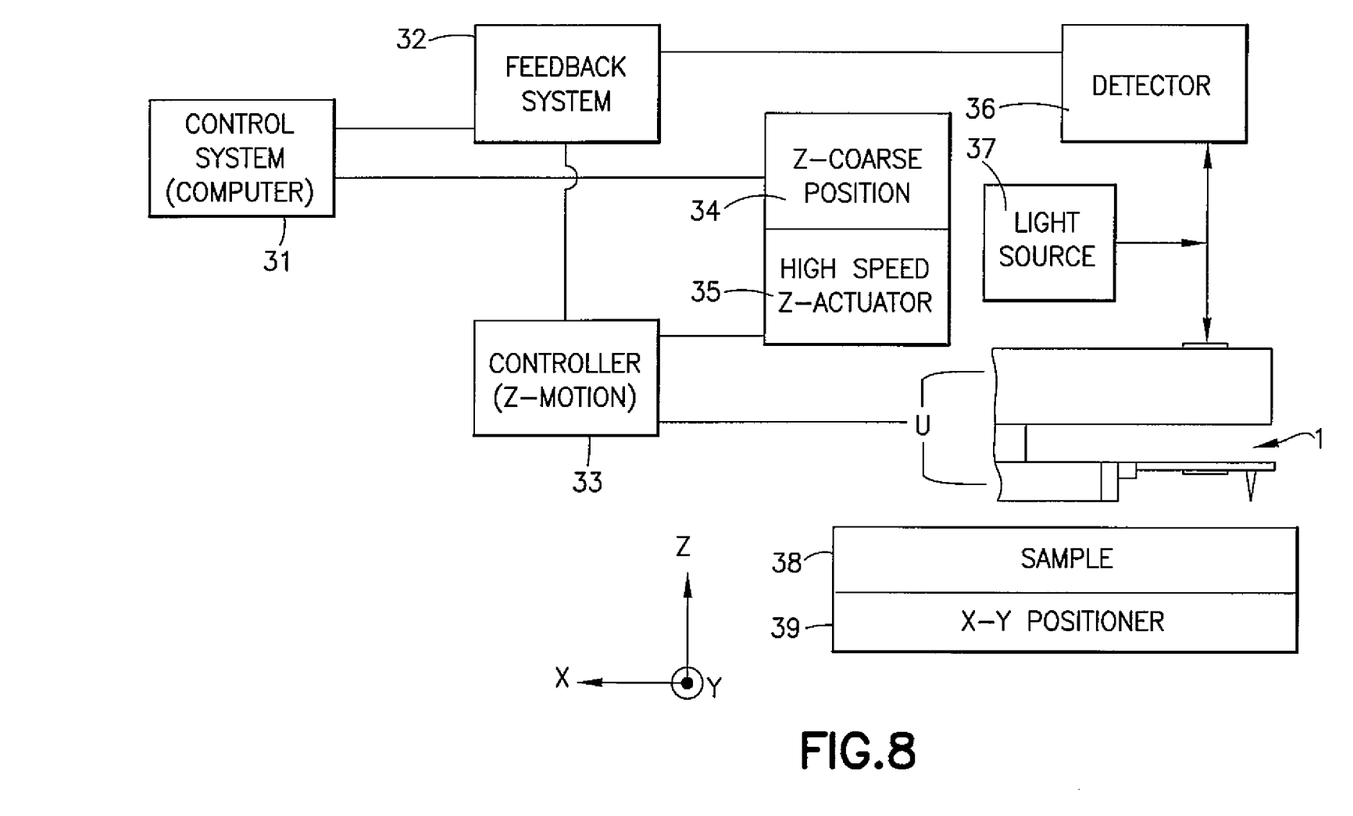
FIG. 8 is a block diagram showing various components of an AFM system, as in embodiments.

More generally, and as illustrated in FIG. 8, the present AFM systems 1, 1a typically comprise a feedback unit 32, which is connected to the detector 36, 36a to receive first signals therefrom and transmit second signals dependent on the first signals received. A height (or z-) controller 33 is connected to the feedback unit 32 to receive said second signals and configured to apply a voltage $U_{Cantilever}$ between the cantilever support 20 and the cantilever 10, 10a, according to said second signals.

The height controller 33 is preferably connected to a high-speed height actuator 34, for fast reaction to the feedback mechanism 36-32-33-35. The actuator 34 may form part of a more general actuator 33, 34, which includes a coarse actuator 33, controlled by a computerized control system 31. The latter is otherwise connected to the feedback unit 32, to control parameters of the feedback mechanism.

Figure 7B:
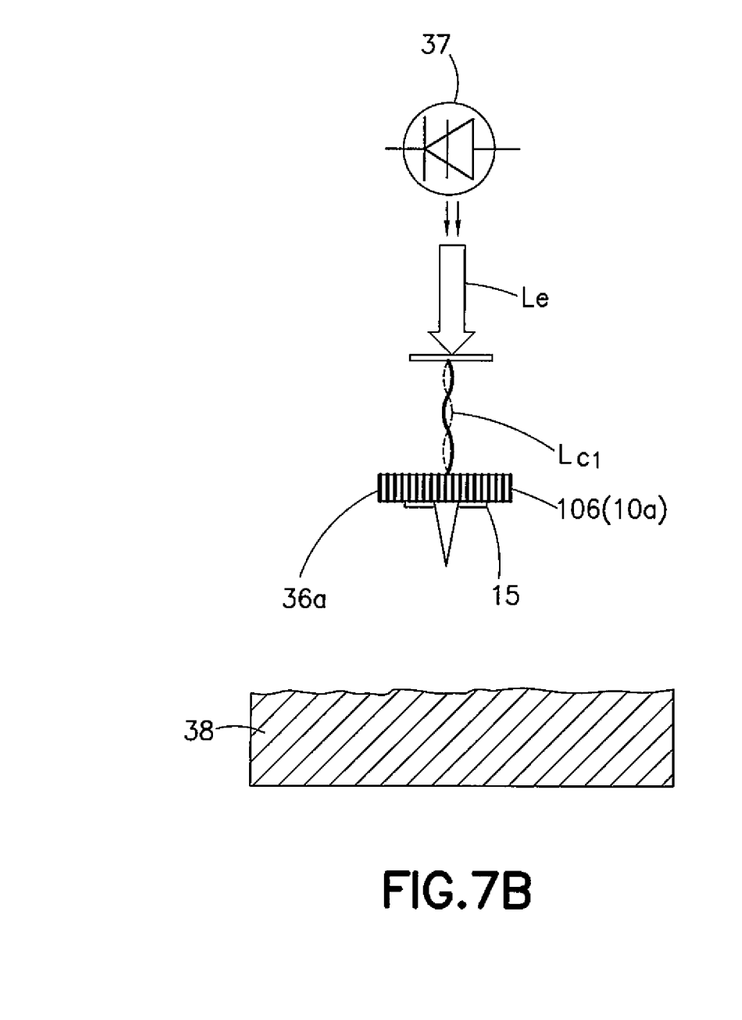

The system 1 shown in FIG. 8 is assumed to have a scanning sample design, wherein the sample 38 is scanned below the probe tip 11, thanks to an x-y positioner 39. In addition, the system 1 of FIG. 8 assumes an external detector 36. The general design would, however, remain essentially identical if an integrated sensor were used. In that case, the integrated sensor (e.g., a photodiode as in FIG. 5) is connected to the feedback unit 32 to feed it with signals as obtained by measuring, e.g., light intensity changes at the level of the cantilever's platform 106 (FIGS. 7A, 7B).

Preferably, no diffraction grating is involved in the optical path, between the mirrors 15, 25, as light does not need to be diffracted in preferential directions for detection purposes in the present context. Rather, a detector 36, 36a can be placed so as to sense a property impacted by interferences of light confined in the resonator, e.g., inside the resonator (as in FIG. 5). Note that the detector may, however, involve several components that do not all need be placed in the resonator. Also, if a temperature is sensed, the temperature sensor just need be in thermal communication with a component heated by the confined light in the resonator.

Referring back to FIGS. 4, 5, the cantilever 10, 10a, the insulating element 5 and the cantilever support 20, 20a may advantageously have a silicon-insulator-silicon structure. That is, the components 10, 10a, 5 and 20 may be obtained from a silicon-on-insulator (SOI) fabrication process. I.e., each of the cantilever 10, 10a and the cantilever support 20 may comprise silicon, while the insulating element 5 may result from structuring the buried silicon oxide, as made possible with SOI fabrication processes.

The present devices can be fabricated using conventional fabrication steps, e.g., involving photolithography, metal evaporation, sputtering of dielectric coatings, and lift-off. The device of FIG. 5 requires additional steps to thin down the backside chip 20a, e.g., by dry or wet etching. A preferred method is to thin it all the way to the (not yet released) oxide 5. In this way planarity of the etched part is optimal. Then an amorphous silicon layer and the planar mirror are deposited. Afterwards the oxide 5 is removed underneath the lever to yield the depicted structure.

Incidentally, we note that the natural reflectivity of silicon can be used as mirrors 15, 25. That is, a resonator may be formed by an upper surface of the support 20 and the lower surface of the cantilever arm 15, provided such surfaces are suitably polished. Yet, more sophisticated mirrors are preferred to improve reflectivity.

Namely, referring to FIG. 5, the first mirror 15 may be explicitly formed by several layers, for example by three, superimposed layers 151-153 arranged on the cantilever 10a. A first layer 151 is for instance used as an optical spacer (it typically comprises $SiO_2$, especially if the cantilever is made of silicon). The second layer 152 comprises any suitably reflective substance (e.g., silver), coated on the first layer 151. A third layer 153, which may again comprise $SiO_2$, can be coated on the reflective substance to act as a protective layer.

For example, the reflective substance 152 may comprise silver; the second layer 152 may have a thickness of 50 nm. The first layer ($SiO_2$) 151 may have a thickness of 30 nm and the third layer ($SiO_2$) 153 may be 10 nm thick.

In variants, a two-layer structure may be used, e.g., with gold instead of silver (to prevent oxidization). In other variants, a multi-layer structure may be contemplated, as for the second mirror 25, see below. In still other variants, a high-contrast grating mirror can be used, e.g., with a periodic structure directly etched into the silicon lever, such that no additional material is required.

In addition, the second mirror 25 may, in embodiments, comprise a distributed Bragg reflector (DBR), to improve reflectivity. I.e., the second mirror 25 may involve multiple sublayers of alternating materials with distinct refractive indices, whereby each sublayer boundary causes partial reflection of light in the resonator. More generally, the second mirror 25 may be designed so that its refractive index exhibits periodic variations.

In particularly preferred embodiments, the DBR 25 comprises multiple pairs 25a-25h of layers 251, 252, wherein each of the pairs 25a-25h comprises a layer 251 of $SiO_2$ and a layer 252 of $Ta_2O_5$. The DBR may for instance comprise 8 pairs 25a-25h, wherein the thickness of each layer in each pair is equal to $\lambda/4n$, where $\lambda$ is the average wavelength of light emitted by the light-emitting device 37 and n is the refractive index of each layer in the pair. For optical waves whose wavelength approaches four times the optical thickness of the layers, reflections combine with constructive interference and the layers thus act as a high-quality reflector. The $SiO_2$ layers may for instance be made 265.4 nm thick (n~1.46), while the thickness of the $Ta_2O_2$ layers may be of 185.4 nm (n~2.09), for an incident light le having an average wavelength of 1550 nm.

In variants, a metal mirror or a high-contrast, grating mirror may provide a sufficiently good alternative to the DBR 25.

In embodiments, the DBR 25 is arranged on a recessed surface 22 of the support 20, as further illustrated in FIG. 5. To that aim, the support 20 may for instance be back-etched so as to exhibit the desired recessed surface 22. E.g., a hole can be etched into a silicon chip 20. Providing a recessed surface 22 allows the thickness of the backside electrode to be decreased, which in turn allows the resonator length to be reduced and the free spectral range (i.e., the difference in wavelength between two cavity resonances of different longitudinal order) to be increased. The mirror 25 can then be deposited via sputter deposition. No additional, antireflection coating is necessary on the outer side of the DBR 25 in that case.

Yet, instead of an integrated laser source and an integrated photodetector, the light may, in variants, be guided through optical fibers from an external source to the structure and the reflected light may be guided from the structure to an external detector.

Using the present approach, the average thickness of the cantilever 10 may typically be between 0.3 and 3 μm. This thickness is measured along axis z in the appended drawing; the cantilever 10 generally extends in the plane (x, y) subtended by directions x and y, where directions x, y and z are perpendicular two by two. In addition, the average thickness of the insulating element 5 may typically be between 1 and 3 μm, as may be obtained using, e.g., a SOI fabrication process. In embodiments, the maximal thickness of the cantilever support 20 is between 450 and 600 μm. If the surface 22 on which the DBR 25 is arranged is recessed, as in FIG. 5, then the thickness of the support 20 may reduce to a few microns in this region and be, e.g., between 2 and 10 μm.

Referring again to FIGS. 4, 5, 7A, and 7B, another aspect is now described, which relates to a method for measuring a deflection of a cantilever 10 of an AFM system 1, 1a such as described above. The main features of this method have already been evoked earlier. Essentially, the method comprises injecting light into the resonator and detecting induced changes, while scanning a sample surface 38.

Namely, the light-emitting device 37 is energized for it to emit light Le toward the outer (top) side of the second mirror 25, so as to confine emitted light between the first mirror 15 and the second mirror 25. Meanwhile, a detector 36, 36a is used to detect a property of the system 1, 1a that is impacted by interferences of the confined light $Lc_1$, $Lc_2$. These interferences depend on the deflection of the cantilever 10, as illustrated in FIGS. 7A-7B.

The method may for instance be carried out by raster scanning the position of the sample 38 with respect to the probe tip 11 and recording the height of the probe that corresponds to a constant probe-sample interaction. As explained earlier in reference to FIG. 8, an electronic feedback loop (involving the feedback unit 32) and the z-controller 33 can otherwise be used to keep the probe-sample force constant during the scanning.

In preferred embodiments such as discussed earlier, the detection relies on sensing changes in said interferences of light upon deflection of the cantilever. In particular, an integrated photodiode 36a (e.g., a p-n junction photodiode) may be used to sense changes of light intensity (at the level of the cantilever 10a or the support 20), upon deflection of the cantilever 10a.

As evoked earlier, the optical length of the cavity may slightly deviate from its ideal value (a multiple of λ/2), for implementing a detection mechanism such as based on a "side-of-the-fringe" locking of a laser. In such cases, the optical path length is not set to the peak center but to the peak side-slope. This, in turn, requires to quite precisely control the cavity length, which can be achieved by a static bias voltage on the back-electrode for the deflection, an electro-refractive layer or, still, by other, methods known in the art.

Figure 6B:
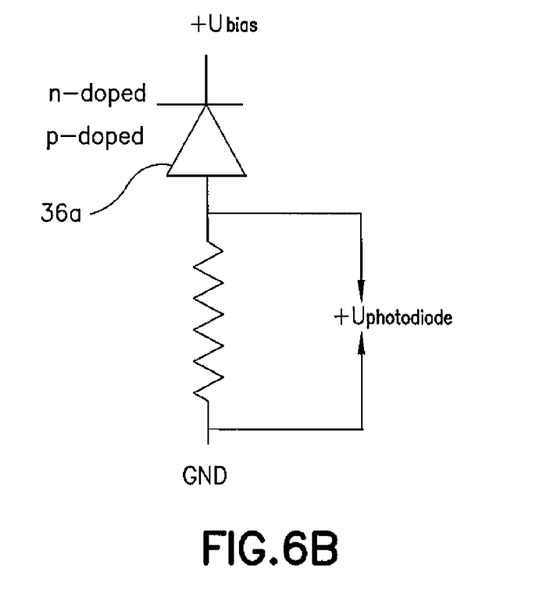
FIG. 6B illustrate a basic circuit, connected to the photodetector of FIG. 6A, to measure a photo current.
Figure 9:
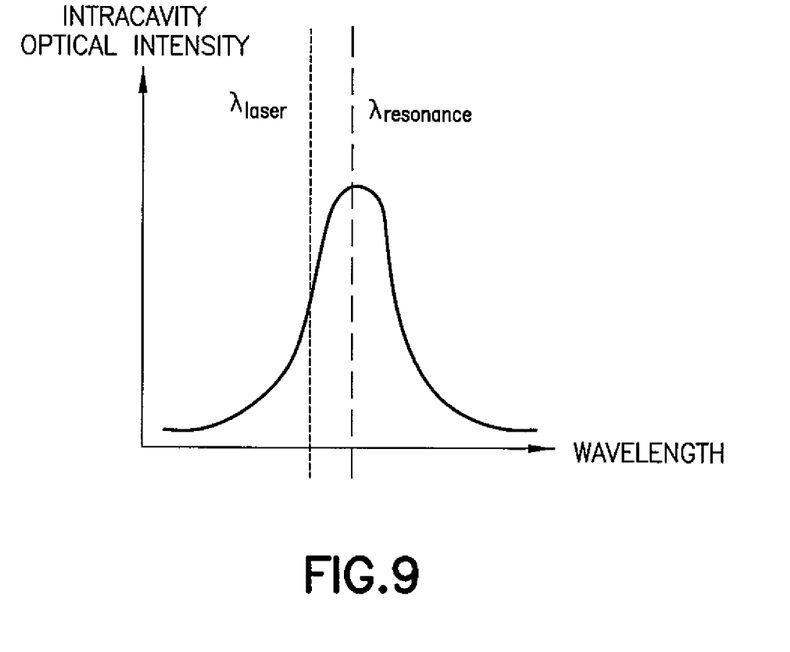
FIGS. 9 and 10 are plots illustrating a detection/locking mechanism, as used to operate an AFM system according to embodiments.
Figure 10:
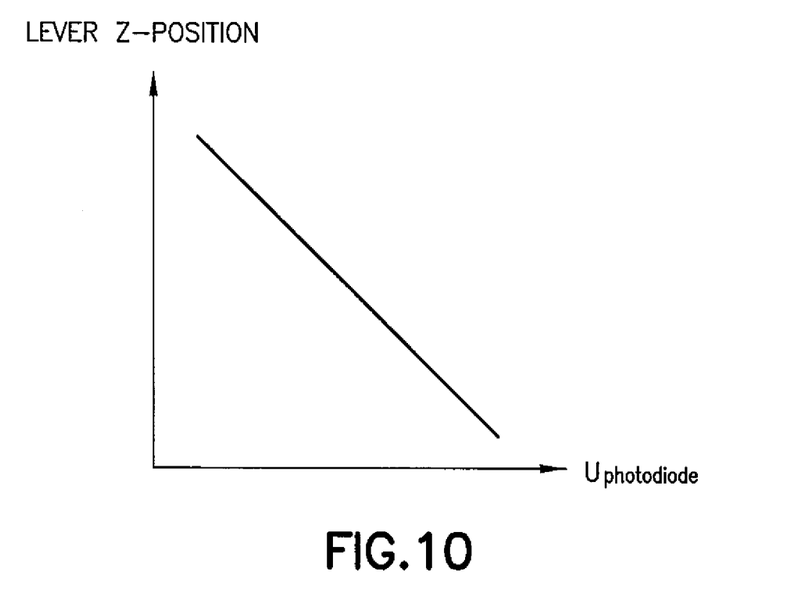

For example, as illustrated in FIG. 9, the average wavelength $\lambda_{laser}$ of the light Le emitted by the light-emitting device 37, e.g., a laser, can be slightly lower than the average resonance wavelength $\lambda_{resonance}$ of the cavity. In variants, $\lambda_{laser}$ could also be slightly higher, i.e., on the other side of the peak maximum. The deviation may for instance correspond to the half width of the peak, as assumed in FIG. 9. The wavelength $\lambda_{laser}$ is fixed but $\lambda_{resonance}$ changes upon pivotal deflection of the cantilever (which changes its z-position). This results in a change of the intra-cavity optical intensity, which can then be detected by the integrated photodiode. A "side-of-the-fringe" detection/locking can thus be implemented. The cantilever position (in z) is typically an affine function of the measured voltage $U_{photodiode}$. I.e., as per the circuit arrangement of FIG. 6B, the voltage drop induced by the photocurrent can be measured over a resistor. Namely, FIG. 6B depicts a basic circuit, connected to the pn-junction 36a, which illustrates how to apply a reverse bias $U_{bias}$ and measure the photo current via a voltage drop $U_{photodiode}$ over the resistor. Other (more sophisticated) ways of measuring a photocurrent are known in the art (e.g., with operational amplifiers).

When the length of the optical resonator, i.e., the distance between the two mirrors 15, 25, gets longer as a result of the cantilever being pulled towards the sample surface, the resonance peak in FIG. 9 shifts towards larger wavelengths. As a consequence, the transmission of the laser into the resonator, and hence the intra-cavity optical power, is reduced (in FIG. 9, the fixed-wavelength laser would then be located farther in the left-hand side tail of the shifted peak). This leads to smaller photocurrent or to a smaller value of $U_{photodiode}$ if the photocurrent is measured as the voltage drop over a known fixed resistor. The sign of the slope of the response would reverse if the other side of the fringe were chosen for the laser wavelength.

Other detection scheme can, however, be contemplated, such as based on generally known methods like the so-called "Pound-Drever-Hall" or "Hansch-Couillaud" methods, to detect the lever z-position or stabilize it using the cavity resonance peak.

According to a first aspect, the present invention is embodied as an AFM system. The system comprises: an electrically conducting cantilever support; an electrically insulating element; and an electrically conducting cantilever anchored at a first end to the cantilever support via the insulating element. The cantilever comprises a probe tip at a second end thereof, e.g., at a free end, opposite to said first end. The cantilever support is configured as a backside electrode of the cantilever for backside actuation thereof. In addition, the system further comprises a Fabry-Perot interferometer. The latter comprises a resonator with a first mirror, defined on the cantilever and a second mirror, defined on the cantilever support. The second mirror has a first (inner) side and a second (outer) side, the mirror configured to allow light injection therefrom, opposite to its first side. The first side of the second mirror extends at least partly vis-à-vis the first mirror. The interferometer further includes a light-emitting device and a detector. The light-emitting device is configured to emit light toward said second side. The detector is configured for detecting a property of the system impacted by interferences of light (emitted by the light-emitting device) that is confined between the first mirror and the second mirror. Such interferences depend on a deflection of the cantilever, in operation.

In embodiments, the detector comprises one or more photodetectors, configured in the system to sense changes in said interferences of light upon deflection of the cantilever, in operation. Preferably, the detector comprises a photodiode, which is arranged so as to intercept an optical path of light confined in the resonator. Advantageously, the photodiode is integral with the cantilever or the cantilever support. The photodiode may for instance be configured as a p-n junction photodiode or as a PIN junction photodiode, structured in an element of the cantilever, e.g., in a platform thereof.

According to another aspect, the invention is embodied as a method for measuring a deflection of a cantilever of an AFM system such as described above. Basically, this method comprises emitting light in the resonator, so as to confine light therein, and detecting a property of the system that is impacted by interferences of the confined light, while scanning a sample surface.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. An atomic-force microscope system, comprising:
   an electrically conducting cantilever support;
   an electrically insulating element;
   an electrically conducting cantilever anchored at a first end to the cantilever support via the insulating element, wherein:
      the cantilever comprises a probe tip at a second end thereof; and
      the cantilever support is configured as a backside electrode of the cantilever for backside actuation thereof,
   and wherein the system further comprises:
      a Fabry-Perot interferometer, comprising:
         a resonator with:
            a first mirror, defined on the cantilever; and
            a second mirror, defined on the cantilever support, having a first side and a second side configured to allow light injection, opposite to said first side, the latter extending at least partly vis-à-vis the first mirror;
         a light-emitting device, configured to emit light toward said second side; and
         a detector, configured for detecting a property of the system impacted by interferences of light emitted by the light-emitting device that is confined between the first mirror and the second mirror, the interferences depending on a deflection of the cantilever, in operation.

2. The atomic-force microscope system according to claim 1, wherein
   the detector comprises one or more photodetectors, configured in the system to sense changes in said interferences of light upon deflection of the cantilever, in operation.

3. The atomic-force microscope system according to claim 2, wherein
   the detector comprises a photodiode, which is arranged so as to intercept an optical path of light confined in the resonator and is integral with one of: the cantilever; and the cantilever support.

4. The atomic-force microscope system according to claim 3, wherein
   said photodiode is a p-n junction photodiode or as a PIN junction photodiode.

5. The atomic-force microscope system according to claim 4, wherein
   the cantilever comprises an element arranged so as to intercept said optical path and configured as said photodiode.

6. The atomic-force microscope system according to claim 1, wherein
   the system comprises no diffraction grating between the first mirror and the second mirror.

7. The atomic-force microscope system according to claim 1, wherein the system further comprises:
   a feedback unit, connected to said detector to receive first signals therefrom and transmit second signals dependent on the first signals received; and
   a height controller connected to the feedback unit to receive said second signals and configured to apply a voltage between said cantilever support and said cantilever, according to said second signals.

8. The atomic-force microscope system according to claim 1, wherein
   the cantilever, the insulating element and the cantilever support have a silicon-on-insulator type of silicon-insulator-silicon structure.

9. The atomic-force microscope system according to claim 1, wherein
   said first mirror comprises three superimposed layers arranged on the cantilever, wherein a first one of the layers is an optical spacer that comprises $SiO_2$, a second one of these layers comprises a reflective substance coated on the first one of the layers, and a third one of the layers is coated on the reflective substance and comprises $SiO_2$.

10. The atomic-force microscope system according to claim 9, wherein
    the reflective substance comprises silver and the second one of the layers has a thickness of 50 nm, the first one of the layers having a thickness of 30 nm.

11. The atomic-force microscope system according to claim 1, wherein
    said second mirror comprises a distributed Bragg reflector (DBR).

12. The atomic-force microscope system according to claim 11, wherein
    said DBR comprises multiple pairs of layers, each of the pairs comprising a layer of $SiO_2$ and a layer of $Ta_2O_5$.

13. The atomic-force microscope system according to claim 12, wherein
    the DBR comprises 8 pairs of layers, wherein the thickness of each of the layers in each of the pairs is equal to 1/4n, where 1 is the average wavelength of light emitted by the light-emitting device and n is the refractive index of said each of the layers.

14. The atomic-force microscope system according to claim 12, wherein
    said DBR is arranged on a recessed surface of the support.

15. The atomic-force microscope system according to claim 1, wherein
    an average thickness of the cantilever is between 0.3 and 3 μm.

16. The atomic-force microscope system according to claim 15, wherein
    an average thickness of the insulating element is between 1 and 3 μm.

17. The atomic-force microscope system according to claim 16, wherein
    a maximal thickness of the cantilever support is between 450 and 600 μm.

18. A method for measuring a deflection of a cantilever of an atomic-force microscope system according to claim 1, the method comprising, while scanning a sample surface:

energizing the light-emitting device for it to emit light toward said second side, so as to confine emitted light between the first mirror and the second mirror; and detecting, with said detector, a property of the system that is impacted by interferences of the confined light, the interferences dependent on a deflection of the cantilever.

19. The method according to claim 18, wherein the detector comprises one or more photodetectors, configured in the system to sense changes in said interferences of light upon deflection of the cantilever, in operation, and wherein the detecting further comprises sensing changes in said interferences of light upon deflection of the cantilever, via said one or more photodetectors.

20. The method according to claim 18, wherein the cantilever comprises an element arranged so as to intercept said optical path and configured as said photodiode, and wherein the detecting comprises sensing changes of light intensity via said photodiode.

* * * * *